United States Patent [19]

Gorgone et al.

[11] 4,147,430

[45] Apr. 3, 1979

[54] SECONDARY DETECTION SYSTEM FOR SECURITY VALIDATION

[75] Inventors: Robert L. Gorgone, Mentor; Gerald Iannadrea, Painesville; Alan J. Kovach, Cleveland, all of Ohio

[73] Assignee: Ardac, Inc., Willoughby, Ohio

[21] Appl. No.: 740,614

[22] Filed: Nov. 10, 1976

[51] Int. Cl.[2] .......... G01N 21/34; G06K 9/08; G06K 7/10

[52] U.S. Cl. .......... 356/51; 250/239; 250/349; 250/556; 356/71; 356/448

[58] Field of Search .......... 356/71, 51, 212; 250/556, 338, 349, 353, 575, 239

[56] References Cited

U.S. PATENT DOCUMENTS

| | | | |
|---|---|---|---|
| 3,664,752 | 5/1972 | Hermieu | 250/575 |
| 3,916,194 | 10/1975 | Novak et al. | 250/556 |

*Primary Examiner*—Vincent P. McGraw
*Attorney, Agent, or Firm*—Oldham, Oldham, Hudak & Weber Co.

[57] ABSTRACT

A secondary detection system for utilization with a security validation apparatus wherein a sensing is made of the amount of light reflected from a given area of a paper security. Fundamentally, the invention consists of an infrared lamp or other emission source casting light through a tunnel and upon a highly reflective but partially transmissive surface. The reflective surface directs a light portion of the light onto the paper security. A first solar cell is provided in juxtaposition to the reflective surface for sensing the amount of light reflected onto the paper while a second solar cell is provided for receiving and sensing that quantity of light reflected back from the paper. A comparator circuit is interconnected between the two solar cells to determine the validity of the paper security on the basis of the percentage of light incident to the paper which is reflected therefrom. In actuality, the reflective surface is partially light transmissive and the first solar cell is positioned behind the reflective surface such that the reading of the light reflected by the reflective surface is actually achieved by the determination of the amount of light transmitted therethrough.

12 Claims, 6 Drawing Figures

SECONDARY DETECTION SYSTEM FOR SECURITY VALIDATION

BACKGROUND OF THE INVENTION

The instant invention deals in the art of security validation apparatus and particularly with an improvement therein. Heretofore, in validating currency or other securities, it has been known that certain designs or patterns within the currency or security may be correlated or masked against a reference to determine validity. However, with modern day reproduction apparatus it has been found that these primary tests of validation may be deceived by means of high resolution photo copies or the like. It has been further known, however, that photo copies are, for the most part, reproduced with an ink which is highly absorptive to infrared and/or visible light. However, some valid currencies, notes and other securities have certain areas thereon which are largely reflective to such light. While valid currencies contain these highly reflective areas, a photo copy of the same will be absorptive to the light in the correlated areas. Consequently, in the past a test has been proposed for checking the authenticity of a paper being passed as a valid security by sensing the infrared or visible light reflective or absorptive characteristics of certain areas of the paper.

Referring now to FIG. 1, there is shown a prior art teaching or apparatus utilized for the above-mentioned test. Since this test is generally incorporated in addition to a primary test of pattern recognition, the apparatus of FIG. 1 is often referred to as a secondary detection system. It can be seen that this system, designated generally by the numeral 10, includes a lamp 12 which emits a light preferably in the infrared range. A portion of the light emitted from the lamp 12 is passed to a solar cell 14 by means of a vane 16 appropriately positioned and angled. As will be appreciated later, the vane 16 is preferably of a reflective metallic nature. Other portions of light emitted from the lamp 12 strike the paper 20 which is to be tested for validity and are reflected therefrom toward a second solar cell 18. In general, the paper 20 will be so positioned above the lamp 12 that an area 22, being generally absorptive as to infrared and/or visible light, is in close juxtaposition thereto. It is the light reflected from the area 22 which is received by the solar cell 18. In consideration of the showing of FIG. 1, it should be particularly appreciated that the amount of light received by the solar cell 14 from the lamp 12 is directly dependent upon the positioning and angling of the vane 16.

With reference now to FIG. 2, a schematic diagram of the sensing circuit of the prior art may be seen as designated generally by the numeral 23. It should be noted that the solar cells 14, 18 are differentially connected to the amplifier 24; the amplifier having a feedback resistor 25 connected thereto. The output of the amplifier 24 is directly dependent upon the differential of current flow through the solar cells 14, 18. Of course, as is well known in the art, the amount of current flowing through a solar cell is directly proportional to the amount of light impinging thereon. Consequently, if both solar cells 14, 18 receive the same amount of light incident thereto, the output of the amplifier 24 will be null. As variations of light intensity incident to the solar cells 14, 18 change, positive or negative output voltage levels will be evidenced at the output of the amplifier 24, these voltage levels being indicative of the discrepancy between the amount of light incident to the solar cell 14 and that incident to the solar cell 18. If the solar cell 14 is designated as a reference solar cell and the vane 16 is physically adjusted, by positioning, bending and the like, such that the solar cell 14 receives the same amount of light as would be reflected to the solar cell 18 from the area 22 of a properly positioned valid paper 20, then the current produced by the reference cell 14 will be identical to that produced by the sensing cell 18 when the paper 20 is a valid piece of currency or the like. Of course, the reflective characteristics of the paper 20 depend upon the age and wear experienced by the paper. Further, the exact vertical positioning of the paper 20 with respect to the light source 12 and the sensing cell 18 is critical in determining the amount of light reflected from the area 22 to the cell 18. Consequently, due to the aging, wear and positioning considerations recited directly above, the vane 16 is generally adjusted to cause the output of the solar cell 14 to be at the mid point of a bandwidth of acceptable current output levels of the sensing cell 18. Thus, the outputs of the amplifier 24 indicative of an acceptable note, piece of currency or the like is characterized by this bandwidth; any output falling therewithin being indicative of an acceptable instrument.

It should be appreciated with reference to the apparatus of FIGS. 1 and 2 above, that the sensitivity of the system presented is dependent upon any movement of the filament within the lamp 12. Once the light vane 16 has been properly adjusted, the system is tuned only in so far as no further physical movements occur within the system. If, by repetitive thermal expansion and contraction of the filament of the lamp 12, or by jarring or the like, the filament should happen to move, it should be readily apparent that the system integrity would be greatly diminished and that retuning would be necessary. A further problem with this prior art teaching is that it is indeed extremely difficult to tune a system by toying with the positioning and angling of the vane 16. A further inherent drawback of the prior art teaching is that height variations of the paper 20 from the lamp 12 result in different validity readings because the amount of light reflected from the area 22 to the cell 18 is directly dependent upon such spacing. Yet a further inherent drawback with the prior art teaching is that the bandwidth of an acceptable paper is defined by fixed levels or fixed level outputs from the amplifier 24 rather than relative level outputs automatically compensating for aging of the lamp 12 or shifting of the lamp filament.

OBJECTS OF THE INSTANT INVENTION

In light of the foregoing, it is an object of the instant invention to present a secondary detection system for security validation wherein operation is uneffected by positional changes in the lamp filament or aging thereof.

Still another object of the invention is to present a secondary detection system for security validation wherein such system is maintained within a sealed unit having a light source, reference solar cell, and sensor solar cell all maintained therein and wherein a fixed percentage of light emitted from the light source is always transmitted to the reference solar cell and a second fixed percentage of such light is transmitted to the paper being validated.

Yet a further object of the invention is to present a secondary detection system for security validation wherein the vertical positioning of the paper being validated is not as critical as in prior art embodiments and wherein the bandwidth for an acceptable note is established in terms of the relative values.

Still a further object of the invention is to present a secondary detection system for security validation wherein the system is totally independent of the lamp output energy.

Another object of the invention is to present a secondary detection system for security validation which is relatively simplistic in design, reliable in operation, inexpensive to construct, and readily conducive to implementation with state-of-the-art elements.

SUMMARY OF THE INVENTION

The foregoing objects and other objects which will become apparent as the detailed description proceeds are achieved by a secondary detection system for security validation, comprising: a lamp maintained within a housing; light reflection means in light receiving communication with said lamp for reflecting the light upon the security; reference means adjacent said light reflection means for sensing the amount of light reflected thereby and producing a first output signal indicative thereof; light sensing means for receiving light from the security and producing a second output signal indicative thereof; and comparator means interconnected between said reference and light sensing means for receiving said first and second output signals and determining validity of the security on the basis of the relative values of said output signals.

DESCRIPTION OF THE DRAWINGS

For a complete understanding of the objects and structure of the invention, reference should be had to the following detailed description and accompanying drawings wherein.

DETAILED DESCRIPTION OF THE PREFERRED EMBODIMENT

Figure 3:
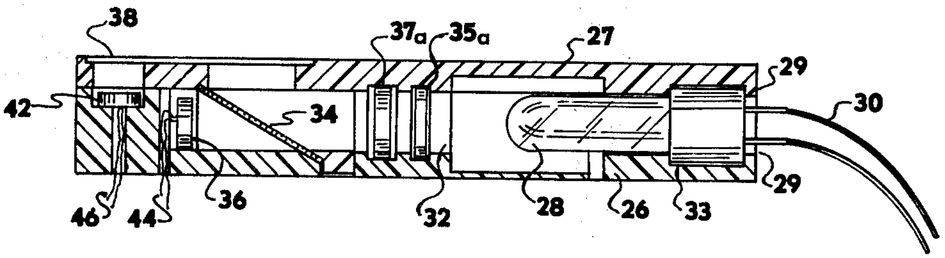
FIG. 3 is a sectional side view of a secondary detection system constructed according to the teachings of the instant invention.
Figure 4:
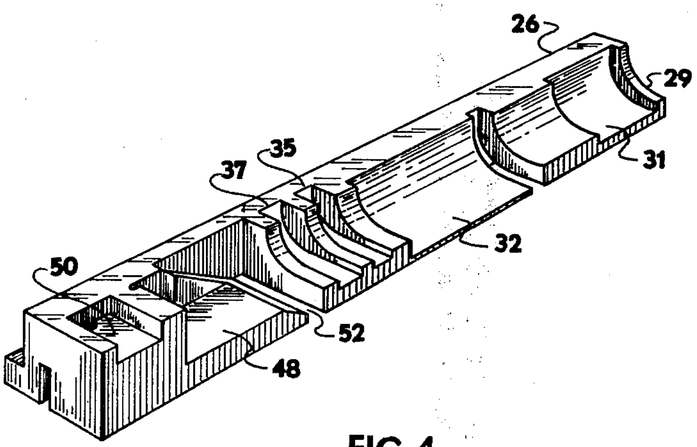
FIG. 4 is an orthogonal view of the body casing of a secondary detection system according to the invention and having one side removed therefrom.
Figure 5:
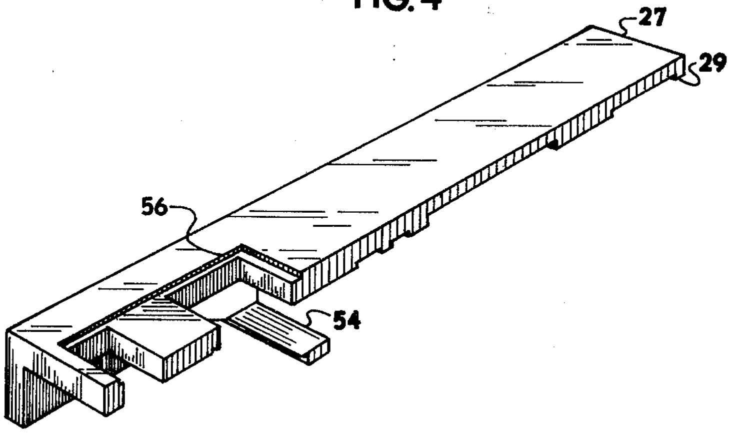
FIG. 5 is an orthogonal view of a cover for the body casing of FIG. 4, again with one side thereof removed.

Referring again to the drawings and more particularly FIGS. 3–5, it can be seen that the basic structure of the invention is comprised of two main components, a body casing 26 and a cover 27. With specific reference to the body casing 26, it can be seen that an end portion thereof is tubularly adapted for receiving a lamp 28 therein. The lamp 28 may be of any suitable nature determined by the characteristics of the security to be tested. Tungsten lamps combined with appropriate filters may be used to obtain the desired spectral bands and it is also contemplated that light emitting diodes, both infrared and visible, may be used. In any event, the invention is conceived as covering the full spectrum from the ultraviolet to infrared. Electrical conductors 30 protrude from the end of the casing 26 in current-carrying connection with the lamp 28 to provide for illumination of the same. A light pipe 32 (best shown in FIGS. 3 and 4) extends from the lamp 28 toward the angled reflective surface 34 to direct the light thereupon. Preferably, the sides of the light pipe 32 are of a highly light-reflective nature with the casing 26 and cover 27 being constructed of a propianate or similarly reflective material.

It should now be appreciated that an extremely high percentage of light emitted from the lamp 28 is passed down the light pipe 32 to the angled reflective surface 34 which is preferably constructed of a metallized mylar or other suitable material and is inclined at an angle of approximately 30° with respect to the base of the casing 26. The specific reflective and transmissive characteristics of the surface 34 are dictated by the particular characteristics of the instrument for which the system will be utilized in running validation tests. Generally speaking, however, the surface 34 will be of a highly reflective nature and consequently of a low transmissive nature. Presently utilized systems have incorporated surfaces 34 having 95 percent reflective and 5 percent transmissive characteristics. Of course, in accordance with the teachings of the invention, such specific values may vary according to need.

Figure 1:
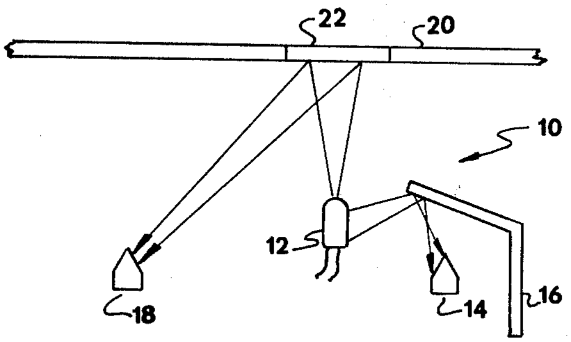
FIG. 1 PRIOR ART
FIG. 1 is a prior art showing of the mechanical structure of previous detection systems.
Figure 2:
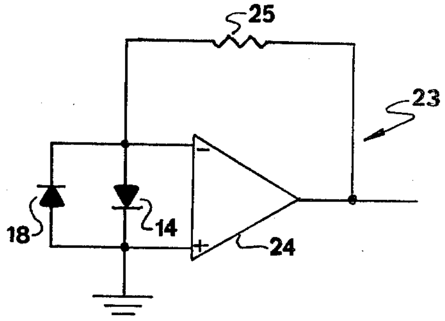
FIG. 2 PRIOR ART
FIG. 2 is a prior art showing of the electronic circuitry associated with the system of FIG. 1.

In light of the foregoing and referring to FIG. 3, it can be seen that a small percentage of light passing from the lamp 28 through the light pipe 32 will be transmitted through the surface 34 and impinge upon the reference solar cell 36. The remainder of the light will be reflected by the shield 34 upwardly through a transparent window 38 to be reflected from the area 22 of the paper 20 (FIG. 1). Certain of the light reflected from the area 22 passes back through the transparent window 38 and impinges upon the sensing solar cell 42. Of course, conductors 44, 46 interconnect the solar cells 36, 42 with appropriate circuitry. It should now be clearly apparent that the solar cells 36, 42 are maintained in fixed relationship to each other and the percentage of light transmitted from the lamp 28 which impinges upon the cell 36 is constant as is the percentage of light passing from the lamp 28 and being reflected to the paper 20. Further, the sealing of the lamp 28 within the casing 26 and cover 27 and the provisions of the highly reflective light pipe 32 guarantee that movement of the filament of the lamp 28 is not critical to the proper functioning of the structure of the system.

With brief reference now to FIGS. 4 and 5, it can be seen that the casing 26 is provided with receptacles 48, 50 for the solar cells and with a void 52 interposed for purposes of receiving the block 54 in snap-sealing engagement therewith. A recessed area 56, is provided for receiving the associated transparent window 38 as discussed above. While particular sizes are not of critical importance to the teachings of the instant invention, it should be appreciated that the total overall length of the unit shown in FIGS. 3–6 is approximately one and one half inches, dependent upon the particular lamp used, and the elements thereof are shown quite nearly to scale. With all of the elements held in close positional relationship with respect to each other, the unit operates accurately and reliably with no need for mechanical adjustments or operations. A lip 29 at the end of the casing 26 and cover 27 provides means for retaining a socket 33 of the lamp 28 within the recess 31 and thus maintain the lamp 28 at an end of the light pipe 32.

As discussed above, the lamp 28 may be of any suitable nature and the invention is contemplated for operation over the entire spectral band from infrared to ultraviolet and including the visible light therebetween. Consequently, slots 35, 37 are provided for receipt of appropriate filters 35*a*, 37*a*, within the light pipe 32; the specific characteristics of the filters being dictated by the ink characteristics of the security being validated and the nature of the lamp 28 being utilized.

Figure 6:
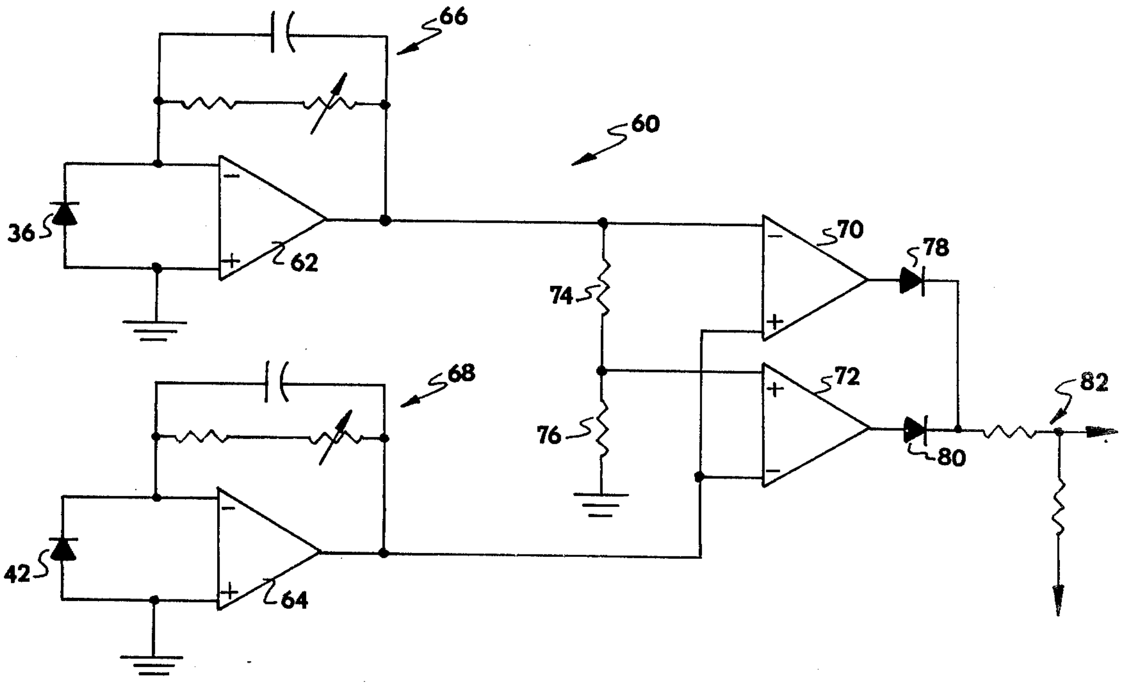
FIG. 6 is a schematic diagram of the detection circuitry of the invention.

With reference now to FIG. 6, it can be seen that the circuitry of the invention is designated generally by the numeral 60 and includes operational amplifiers 62, 64 respectively being connected to the reference cell 36 and sensing cell 42. Each of the amplifiers 62, 64 is provided with a feedback network 66, 68; each network being provided with a variable resistor for purposes of adjustment and tuning. The outputs of the operational amplifiers 62, 64 are applied to the input of the amplifiers 70, 72 which are connected to function as comparators. As can be seen, the sensing amplifier 64 is connected directly to the positive and negative inputs of the amplifiers 70, 72 respectively while the output of the reference amplifier 62 is connected directly to the negative input of the amplifier 70 and through the voltage divider 74, 76 to the positive input of the amplifier 72. Thus, and as should be readily apparent to those skilled in the art, the gain of the amplifiers 62, 64 as determined by feedback networks 66, 68 and the percentage of the output of the amplifier 62 applied to the amplifier 72 as determined by the specific values of the voltage divider resistors 74, 76, determines the bandwidth of relative voltage values or light levels for an acceptable instrument. As can be seen, the validity signal is evidenced as at 82 via outputs from either of the amplifiers 70, 72 through associated diodes 78, 80. If either of the outputs of the amplifiers 70, 72 is at a high level, indicating that the relationship between the outputs of the amplifiers 62, 64 does not fall within the acceptable bandwidth, a high level reject signal is evidenced at 82.

In utilizing the particular structure of the invention, the exact positioning of the security above the sensing system is not critical since the light passing through the narrow light pipe 32 and emitted from the small window 38 is nearly collimated upon striking the security. Further, the amount of light reflected from the area 22 and sensed by the solar cell 42 is always compared against the amount of light actually reflected onto the area 22 by the surface 34. This is true since the reference solar cell 36 indirectly senses the amount of light reflected by the surface 34 by directly sensing the amount of light transmitted thereby.

It should now be readily apparent that there has been presented hereinabove a secondary detection system for security validation which satisfies the objects set forth hereinabove and which is not effected by aging of the lamp, which is totally independent of lamp output energy, and wherein the magnitude of the accept or reject (error) signal is totally independent of the amount of light emitted, reflected, or sensed within the system; that is, the error signal is of absolute value.

While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the appended claims.

What is claimed is:

1. A secondary detection system for security validation, comprising:

a lamp maintained within a housing, said housing defining a light pipe;

light reflection means maintained at an end of said light pipe in juxtaposition to the security and in light receiving communication with said lamp for reflecting said light upon the security, said light reflection means being partially light transmissive;

reference means maintained within said housing adjacent said light reflection means for determining the amount of light reflected thereby and producing a first output signal indicative thereof;

light sensing means maintained within said housing and in juxtaposition to the security for receiving light from the security and producing a second output signal indicative thereof; and comparator means interconnected between said reference and light sensing means for receiving said first and second output signals and determining validity of the security on the basis of the relative values of said output signals.

2. The secondary detection system according to claim 1 wherein said reference means comprises a first solar cell producing said first output signal and in juxtaposition to said light reflection means on a side thereof opposite said lamp.

3. The secondary detection system according to claim 2 wherein said light reflection means comprises a planar surface obliquely positioned within said light pipe between said lamp and said reference means.

4. The secondary detection system according to claim 2 wherein said light sensing means comprises a second solar cell producing said second output signal.

5. The secondary detection system according to claim 4 wherein said comparator means includes first and second operational amplifiers respectively connected to said first and second solar cells and receiving and amplifying said first and second output signals.

6. The secondary detection system according to claim 5 wherein said comparator means further includes first and second voltage comparators, each receiving the outputs of the first and second operational amplifiers and producing a fixed level output signal if the first and second output signals are within a predetermined bandwidth of each other.

7. The secondary detection system according to claim 6 wherein said first and second operational amplifiers have variable feedback networks controlling the respective gains thereof and wherein the output of said first operational amplifier is passed to a voltage divider, the gain of each of said operational amplifiers and the voltage divider determining said bandwidth.

8. A secondary detection system for determining the validity of a security, comprising:

a sealed casing;

an infrared lamp maintained at one end of a tunnel defined by said casing;

a planar surface, partially light transmissive and partially light reflective, obliquely positioned at one end of said tunnel for receiving light from said lamp and reflecting said light onto the security;

a first solar cell positioned adjacent said reflective surface for sensing the amount of light transmitted thereby;

a second solar cell positioned for receipt of light reflected by the security;

two transparent windows within said sealed casing, a first window in juxtaposition to said reflective surface and a second window in juxtaposition to said second solar cell, both windows being in juxtaposition to the security; and comparator circuit means connected to and receiving output signals from each of said first and second solar cells for determining the validity of the security as a function of the relative values of the output signals of said respective solar cells.

9. The secondary detection system as recited in claim 8 wherein said first solar cell is positioned on a side opposite said reflective surface from said lamp.

10. The secondary detection system as recited in claim 8 wherein said tunnel linearly expands in cross-sectional area from said lamp to said reflective surface.

11. The secondary detection system as recited in claim 8 wherein said infrared lamp, reflective surface, and first and second solar cells are all maintained within said sealed casing.

12. The secondary detection system as recited in claim 8 wherein said comparator circuit means includes two operational amplifiers having variable gains, the outputs of the amplifiers feeding two voltage comparators, and wherein a voltage divider is interposed between one of said operational amplifiers and one of said voltage comparators.

* * * * *